United States Patent
Rivera (10) Patent No.: US 9,907,425 B2
(45) Date of Patent: *Mar. 6, 2018

(54) REUSABLE BREWING CARTRIDGE

(71) Applicant: Adrian Rivera, Whittier, CA (US)

(72) Inventor: Adrian Rivera, Whittier, CA (US)

( * ) Notice: Subject to any disclaimer, the term of this patent is extended or adjusted under 35 U.S.C. 154(b) by 341 days.

This patent is subject to a terminal disclaimer.

(21) Appl. No.: 14/539,827

(22) Filed: Nov. 12, 2014

(65) Prior Publication Data

US 2015/0068404 A1    Mar. 12, 2015

Related U.S. Application Data

(63) Continuation-in-part of application No. 11/777,831, filed on Jul. 13, 2007, now Pat. No. 8,720,320, and a continuation-in-part of application No. 12/610,181, filed on Oct. 30, 2009, now Pat. No. 8,621,981, and a continuation-in-part of application No. 12/620,584, filed on Nov. 17, 2009, now Pat. No. 8,291,812, and (Continued)

(51) Int. Cl.
| | |
|---|---|
| *A47J 31/42* | (2006.01) |
| *A01K 43/00* | (2006.01) |
| *A47J 31/06* | (2006.01) |
| *A47J 31/36* | (2006.01) |
| *A47J 31/44* | (2006.01) |

(52) U.S. Cl.
CPC ....... *A47J 31/0668* (2013.01); *A47J 31/0678* (2013.01); *A47J 31/0689* (2013.01); *A47J 31/3676* (2013.01); *A47J 31/3695* (2013.01); *A47J 31/4492* (2013.01)

(58) Field of Classification Search
CPC .......... A47J 31/0668; A47J 31/0678; A47J 31/0689; A47J 31/3676; A47J 31/3695; A47J 31/4492
USPC .......... 99/285, 300, 323, 322, 317, 304, 306, 99/307, 295, 312, 314, 315, 279, 485, 99/287, 289 R, 302 R; 426/231–232, 426/590–599, 519, 77–84, 115, 112, 132, 426/135, 394, 473, 477, 479, 482, 435, 426/433; 210/473, 474, 484, 488, 492, 210/497.3, 233, 497.01; 220/212, 521, 220/780, 367.1, 713; 229/404, 906.1
See application file for complete search history.

(56) References Cited

U.S. PATENT DOCUMENTS

| | | |
|---|---|---|
| 2,433,815 A | 12/1947 | Laforge |
| 3,022,411 A | 2/1962 | Soper et al. |

(Continued)

FOREIGN PATENT DOCUMENTS

WO    WO 2005/092160 A1    10/2005

*Primary Examiner* — Dana Ross
*Assistant Examiner* — Ket D Dang
(74) *Attorney, Agent, or Firm* — Kenneth L. Green; Averill & Green (57) ABSTRACT

A reusable brewing cartridge includes a lid having a permanent injection nozzle passage and includes an extraction nozzle pocket permanently open at the top of the cartridge allowing use in a coffee maker configured to puncture a single use disposable cartridge lid with both the injection and extraction nozzles. The cartridge thus avoids puncturing contact with the extraction needle. The reusable brewing cartridge includes at least one passage in a cartridge base allowing brewed drink to escape the reusable brewing cartridge into a coffee container.

18 Claims, 7 Drawing Sheets

Related U.S. Application Data a continuation-in-part of application No. 12/762,262, filed on Apr. 16, 2010, now Pat. No. 9,844,292, and a continuation-in-part of application No. 12/960,496, filed on Dec. 4, 2010, now Pat. No. 9,795,243, and a continuation-in-part of application No. 12/441,584, filed on Mar. 30, 2012, now abandoned, and a continuation-in-part of application No. 13/436,690, filed on Mar. 30, 2012, now Pat. No. 9,232,871, and a continuation-in-part of application No. 13/757,026, filed on Feb. 1, 2013, now Pat. No. 8,967,038, and a continuation-in-part of application No. 14/222,333, filed on Mar. 21, 2014, now Pat. No. 9,242,790, and a continuation-in-part of application No. 14/247,204, filed on Apr. 7, 2014, now Pat. No. 9,572,452, and a continuation-in-part of application No. 14/452,005, filed on Aug. 5, 2014, now abandoned, and a continuation-in-part of application No. 14/531,729, filed on Nov. 3, 2014.

(60) Provisional application No. 61/898,886, filed on Nov. 1, 2013.

(56) References Cited

U.S. PATENT DOCUMENTS

| | | |
|---|---|---|
| 3,115,822 A | 12/1963 | Totten |
| 3,120,170 A | 2/1964 | Garte |
| 3,136,241 A | 6/1964 | Price |
| 3,199,682 A | 8/1965 | Scholtz |
| 3,224,360 A | 12/1965 | Wickenberg et al. |
| 3,316,388 A | 4/1967 | Wickenbert et al. |
| 3,384,004 A | 5/1968 | Perlman et al. |
| 3,405,630 A | 10/1968 | Weber, III |
| 3,583,308 A | 6/1971 | Williams |
| 3,607,297 A | 9/1971 | Fasano |
| 3,757,670 A | 9/1973 | Laama et al. |
| 3,844,206 A | 10/1974 | Weber |
| 3,958,502 A | 5/1976 | Vitous |
| 4,253,385 A | 3/1981 | Illy |
| 4,286,515 A | 9/1981 | Baumann et al. |
| 4,603,621 A | 8/1986 | Roberts |
| 4,703,687 A | 11/1987 | Wei |
| 4,800,089 A | 1/1989 | Scott |
| 4,998,463 A | 3/1991 | Precht et al. |
| 5,000,082 A | 3/1991 | Lassota |
| 5,012,629 A | 5/1991 | Rehman |
| 5,046,409 A | 9/1991 | Henn |
| 5,123,335 A | 6/1992 | Aselu |
| 5,171,457 A | 12/1992 | Acuff et al. |
| 5,233,914 A | 8/1993 | English |
| 5,325,765 A | 7/1994 | Sylvan et al. |
| 5,335,589 A | 8/1994 | Yerves et al. |
| 5,526,733 A | 6/1996 | Klawuhn et al. |
| 5,582,730 A | 12/1996 | Hugentobler |
| 5,649,412 A | 7/1997 | Binacchi |
| 5,636,563 A | 9/1997 | Oppermann et al. |
| 5,676,041 A | 10/1997 | Glucksman et al. |
| 5,829,340 A | 11/1998 | Yang |
| 5,840,189 A | 11/1998 | Sylvan et al. |
| 5,870,943 A | 2/1999 | Levi et al. |
| 5,895,672 A | 4/1999 | Cooper |
| 6,136,352 A | 10/2000 | Silverstein et al. |
| 6,189,438 B1 | 2/2001 | Bielfeldt et al. |
| D454,433 S | 3/2002 | Peter |
| D454,434 S | 3/2002 | McDaniel et al. |
| 6,440,256 B1 | 8/2002 | Gordon et al. |
| D474,110 S | 5/2003 | Sweeney |
| D474,111 S | 5/2003 | Lazaris |
| 6,589,577 B2 | 7/2003 | Lazaris et al. |
| 6,606,938 B2 | 8/2003 | Taylor |
| 6,607,762 B2 | 8/2003 | Lazaris et al. |
| 6,645,537 B2 | 11/2003 | Sweeney et al. |
| 6,655,260 B2 | 12/2003 | Lazaris et al. |
| 6,658,989 B2 * | 12/2003 | Sweeney ............ A47J 31/0642 99/306 |
| 6,708,600 B2 | 3/2004 | Winkler et al. |
| 6,727,484 B2 | 4/2004 | Policappelli |
| 6,740,345 B2 | 5/2004 | Cai |
| 6,777,007 B2 | 8/2004 | Cai |
| 6,832,542 B2 | 12/2004 | Hu et al. |
| 6,843,165 B2 | 1/2005 | Stoner et al. |
| D502,362 S | 5/2005 | Lazaris et al. |
| 6,904,840 B1 | 6/2005 | Pfeifer et al. |
| 6,948,420 B2 | 9/2005 | Kirschner et al. |
| 7,047,870 B2 | 5/2006 | Gantt et al. |
| 7,081,263 B2 | 7/2006 | Albrecht |
| 7,131,369 B2 | 11/2006 | Gantt et al. |
| 7,320,274 B2 | 1/2008 | Casetllani |
| 7,377,089 B2 | 5/2008 | Rapparini |
| 7,946,217 B2 | 5/2011 | Favre et al. |
| 8,047,127 B2 | 11/2011 | Lin |
| 2002/0035929 A1 | 3/2002 | Kanba et al. |
| 2002/0148356 A1* | 10/2002 | Lazaris ............... A47J 31/0668 99/295 |
| 2003/0200872 A1 | 10/2003 | Lin |
| 2004/0005384 A1 | 1/2004 | Cai |
| 2004/0089158 A1* | 5/2004 | Mahlich ............... A47J 31/3623 99/275 |
| 2004/0118290 A1 | 6/2004 | Cai |
| 2005/0223904 A1* | 10/2005 | Laigneau ........... A47J 31/3695 99/295 |
| 2005/0236323 A1 | 10/2005 | Oliver et al. |
| 2005/0257695 A1 | 11/2005 | Dobranski et al. |
| 2006/0011066 A1* | 1/2006 | Bunn ..................... A47J 31/06 99/279 |
| 2006/0159815 A1 | 7/2006 | Crook et al. |
| 2006/0174769 A1 | 8/2006 | Favre et al. |
| 2006/0196364 A1 | 9/2006 | Kirschner |
| 2007/0259074 A1 | 11/2007 | Searchilli et al. |
| 2008/0245236 A1* | 10/2008 | Ternite ................ A47J 31/0668 99/295 |
| 2009/0229471 A1 | 9/2009 | Lun et al. |
| 2010/0083843 A1 | 4/2010 | Denisart et al. |
| 2011/0209623 A1 | 9/2011 | Leung et al. |
| 2011/0274802 A1 | 11/2011 | Rivera |
| 2012/0058226 A1* | 3/2012 | Winkler ............... A47J 31/3695 426/79 |
| 2012/0207895 A1 | 8/2012 | Rivera |
| 2012/0207896 A1 | 8/2012 | Rivera |
| 2012/0276264 A1 | 11/2012 | Rivera |
| 2012/0285330 A1 | 11/2012 | Demiglio et al. |
| 2012/0285334 A1 | 11/2012 | Demiglio et al. |
| 2014/0245895 A1 | 9/2014 | Demiglio et al. |
| 2015/0056331 A1* | 2/2015 | Rivera ............... B65D 85/8043 426/82 |

* cited by examiner

REUSABLE BREWING CARTRIDGE

The present application claims the priority of U.S. Provisional Patent Applicant Ser. No. 61/898,886 filed Nov. 1, 2013, and is a Continuation On Part of:

U.S. patent application Ser. No. 11/777,831 filed Jul. 13, 2007;

U.S. patent application Ser. No. 12/610,181 filed Oct. 30, 2009;

U.S. patent application Ser. No. 12/620,584 filed Nov. 17, 2009;

U.S. patent application Ser. No. 12/762,262 filed Apr. 16, 2010

U.S. patent application Ser. No. 12/960,496 filed Dec. 4, 2010;

U.S. patent application Ser. No. 12/441,584 filed Mar. 30, 2012;

U.S. patent application Ser. No. 13/436,690 filed Mar. 30, 2012;

U.S. patent application Ser. No. 13/757,026 filed Feb. 1, 2013;

U.S. patent application Ser. No. 14/222,333 filed Mar. 21, 2014;

U.S. patent application Ser. No. 14/247,204 filed Apr. 7, 2014;

U.S. patent application Ser. No. 14/452,005 filed Aug. 5, 2014; and

U.S. patent application Ser. No. 14/531,729 filed Nov. 3, 2014, which applications are incorporated in their entirety herein by reference.

BACKGROUND OF THE INVENTION

The present invention relates to brewing coffee and in particular to a reusable brewing cartridge.

Known single and multi-cup coffee makers designed to accept a single use disposable brewing cartridge have become very popular. An example of a single serving coffee maker is sold under the trademark KEURIG® and an example of a single and multi-cup coffee maker is sold under the trademark KEURIG 2.0®. The single cup coffee maker includes an injection needle which punctures the cover of a single use disposable brewing cartridge to inject heated liquid into the cartridge, and an extraction needle residing under the cartridge which punctures the base of the cartridge to release and carry brewed beverage from the cartridge. The single and multi-cup coffee maker includes an injection needle which punctures the cover of a single use disposable brewing cartridge to inject heated liquid into the cartridge, and an extraction needle residing beside the injection needle which also punctures the cover of the cartridge to release and carry brewed beverage from the cartridge. The injection needle is generally centered on the cartridge and the extraction needle resides proximal to the edge of the cartridge.

Unfortunately, some varieties of brewing material are not available in the pre-packaged single use disposable brewing cartridges sold for the multi-cup coffee maker, and the pre-packaged single use disposable brewing cartridge are often expensive. A need thus exists for a reusable brewing cartridge which a user may refill with brewing material of their choice. Unfortunately, the seal created between a disposable brewing cartridge and the extraction needle, created when the extraction needle pieces the disposable brewing cartridge, is lost when a reusable brewing cartridge is used. As a result, if the brewed drink is extracted by the extraction needle from the reusable brewing cartridge, additional sealing features are required.

Further, coffee is generally prepared in a single serving coffee maker by selecting a brewing cartridge containing brewing material and inserting the cartridge into the coffee maker, and providing a stream of hot water through the cartridge. Unfortunately, various cartridges may require more of less water and/or brewing at higher or lower temperatures. Failure to select the correct settings may result to a weak or strong brewed drink, and may overflow a cup. Single and multi-cup coffee makers further require selection of an amount of water for a single cup or for several cups. Some coffee maker systems include single use cartridges with indicia indicating the amount and temperature of water required, and a coffee maker including a reader to read the indicia. If a cartridge is used without such indicia, the coffee maker generally will refuse to operate. Thus a need exists to provide the required indicia.

BRIEF SUMMARY OF THE INVENTION

The present invention addresses the above and other needs by providing a reusable brewing cartridge which includes a lid having a permanent injection nozzle passage and includes an extraction nozzle pocket permanently open at the top of the reusable brewing cartridge allowing use in a coffee maker configured to puncture a single use disposable brewing cartridge lid with both the injection and extraction nozzles. The reusable brewing cartridge thus avoids puncturing contact (i.e., the needle may touch the cartridge, but not puncture the cartridge) with the extraction needle. The reusable brewing cartridge includes at least one passage in a cartridge base allowing brewed drink to escape the reusable brewing cartridge into a coffee container.

In accordance with an aspect of the invention, there is provided a reusable brewing cartridge including an extraction nozzle pocket providing clearance for the extraction needle. The pocket is separated from the interior of the reusable brewing cartridge by the cartridge walls, and does not allow fluid injected into the reusable brewing cartridge to escape into the pocket. The flow of brewed drink through the extraction needle is thus avoided which avoids the need to provide a seal between the reusable brewing cartridge and the extraction needle. At least one base passageway is provided in the base to allow brewed drink to escape from the reusable brewing cartridge into the brewing chamber where it is released into a brewed drink container.

In accordance with yet another aspect of the invention, there is provided a reusable brewing cartridge including a readable identification feature. The reusable brewing cartridge includes a cartridge base and lid made from a material providing a color indicia readable by the coffee maker.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1A:
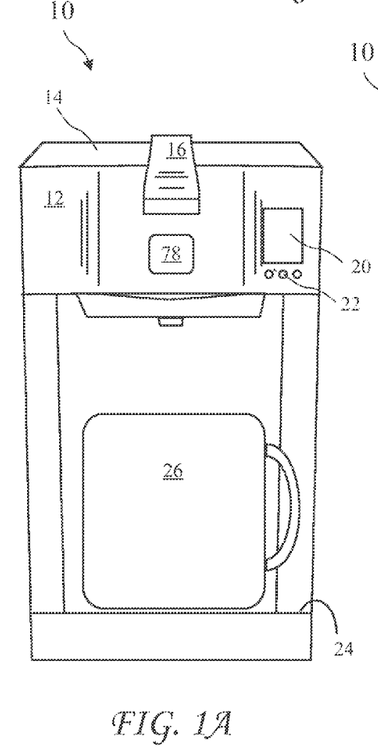
FIG. 1A is a front view of a coffee maker according to the present invention.
Figure 1B:
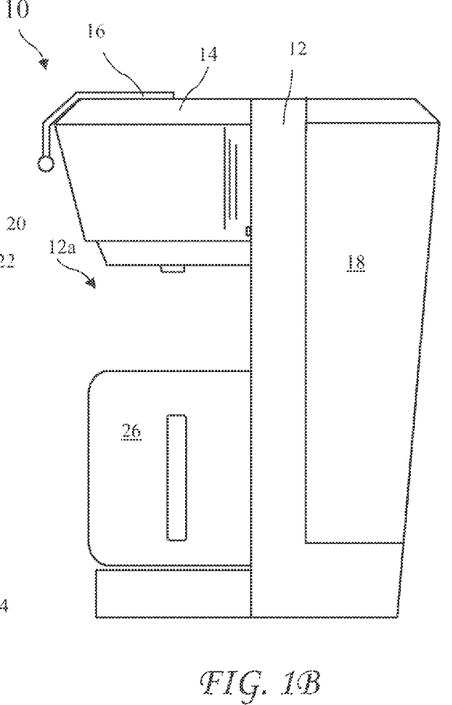
FIG. 1B is a side view of the coffee maker according to the present invention.
Figure 1C:
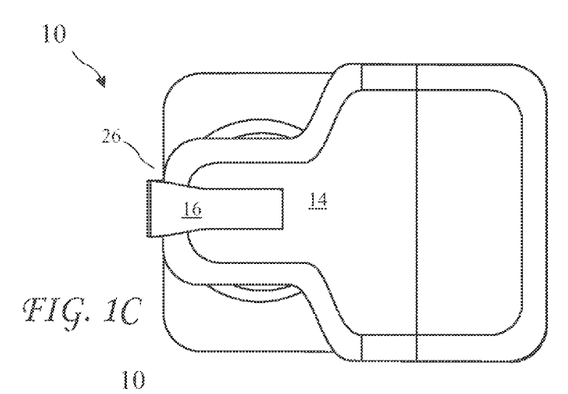
FIG. 1C is a top view of the coffee maker according to the present invention.

A front view of a coffee maker 10 according to the present invention is shown in FIG. 1A, a side view of the coffee maker 10 is shown in FIG. 1B, and a top view of the coffee maker 10 is shown in FIG. 1C. The coffee maker (or beverage brewer) 10 includes a body 12, an opening lid 14, a lid handle 16, a water container 18, a display 20, controls 22, a platform 24 and a mouth 12a. A coffee container 26 rests on the platform 24 inside the mouth 12a. The coffee maker 10 provides a flow of hot water through brewing material to produce a brewed drink. The flow of water may be heated by one of any known means, for example, an electrical heating coil or a conductive coating on tubing carrying the water or inductively heating the water. A reader 78 for an identification indicia may reside in a brewing chamber 11 of the coffee maker 10 to select an amount of water to be pumped through the disposable brewing cartridge 30, and/or the temperature of water to be pumped through the cartridge 30. The identification feature 34 may be attached to the disposable single use cartridge 30 used in the coffee maker 10.

Figure 2:
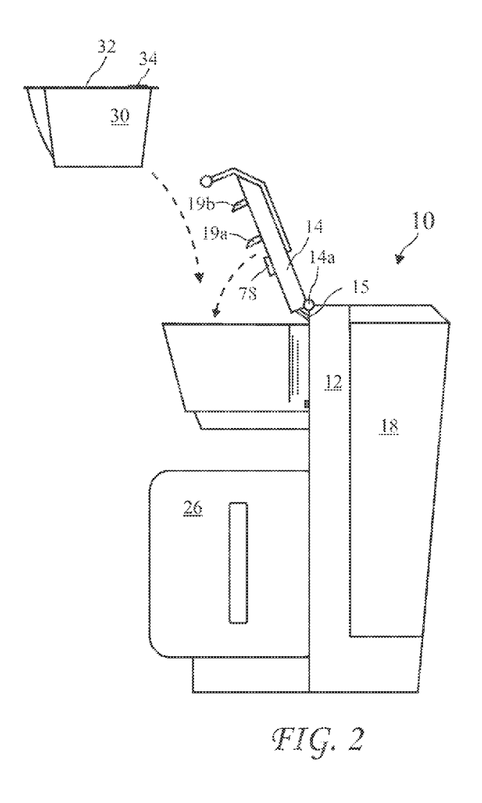
FIG. 2 is a side view of the coffee maker with an open lid allowing placement of a coffee holder according to the present invention inside the coffee maker.

A side view of the coffee maker 10 with an open lid 14 allowing placement of the disposable beverage cartridge 30 inside the coffee maker 10 is shown in FIG. 2. The lid 14 includes a lid hinge 14a and a water tube 15 carries heated water into the lid 14. A pad 17 resides on a bottom surface of the lid 14 and presses against the disposable brewing cartridge 30 when the lid 14 is closed, and in cooperation with other means discloses hereafter, tamps coffee contained in the disposable brewing cartridge 30. An injection nozzle (or needle) 19a extends down from the closed lid 14 penetrating a lid 32 of a disposable brewing cartridge 30 and an extraction nozzle 19b penetrating the lid 32 of a disposable brewing cartridge 30 and directs the flow of brewed drink from the disposable brewing cartridge 30.

Figures 2A, 2B:
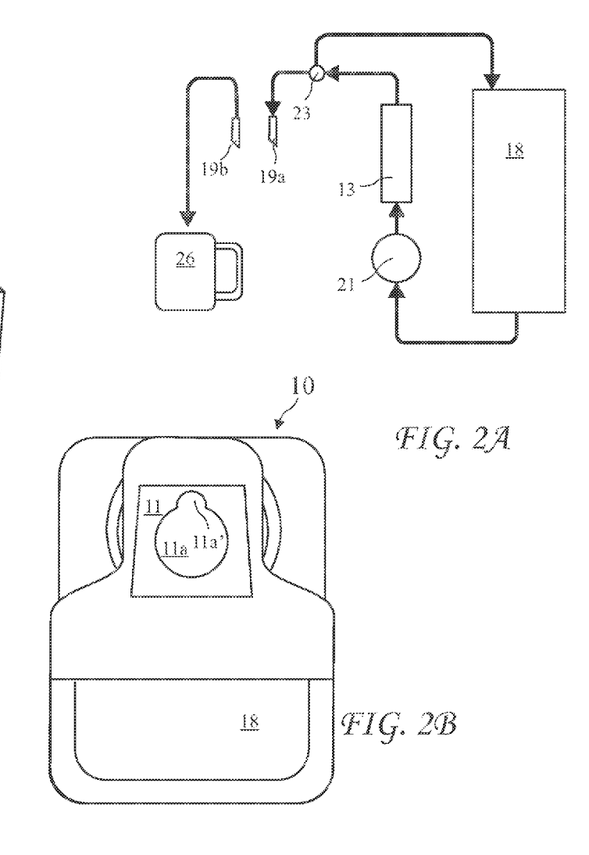
FIG. 2A is a functional diagram of the coffee maker.
FIG. 2B is a top view of the coffee maker with the lid removed showing the brewing chamber and cartridge shelf.

A functional diagram of the coffee maker 10 is shown in FIG. 2A. The preferred coffee maker 10 includes the water tank 18, water pump 21, a heater 13, check valve 23 and the nozzle 19a. The pump 21 preferably provides at least one PSI water pressure. The water heater 13 may include a heating coil or a resistive coating or any other means for heating water. The check valve 23 limits the water pressure at the nozzle 19a by returning some of the water flow to the water tank 18. Brewed drink is released from the disposable brewing cartridge 30 through the extraction nozzle 19b and carried to the coffee container 26. While the water pump 21 is a preferred method for providing a flow of water to the nozzle 19a, other methods include pressuring the water in the water tank 18, and a coffee maker using any means to provide a forced flow of water is intended to come within the scope of the present invention.

A top view of the coffee maker 10 with the lid removed 14 showing the brewing chamber 11 and cartridge shelf 11a is shown in FIG. 2B. The cartridge shelf 11a includes a notch 11a' allowing aligning a brewing cartridge inserted into the brewing chamber 11.

Figure 3A:
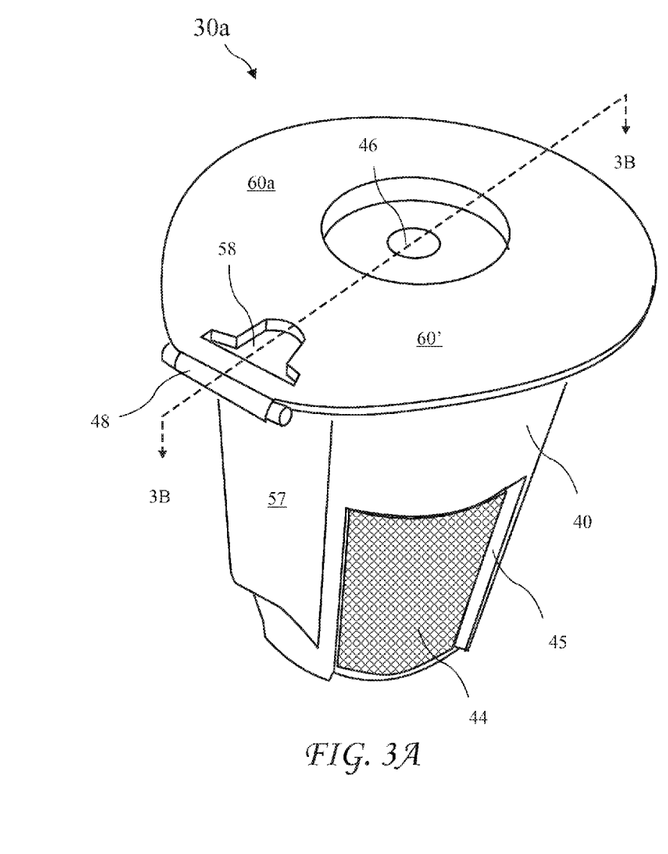
FIG. 3A is a first reusable brewing cartridge according to the present invention.
Figure 3B:
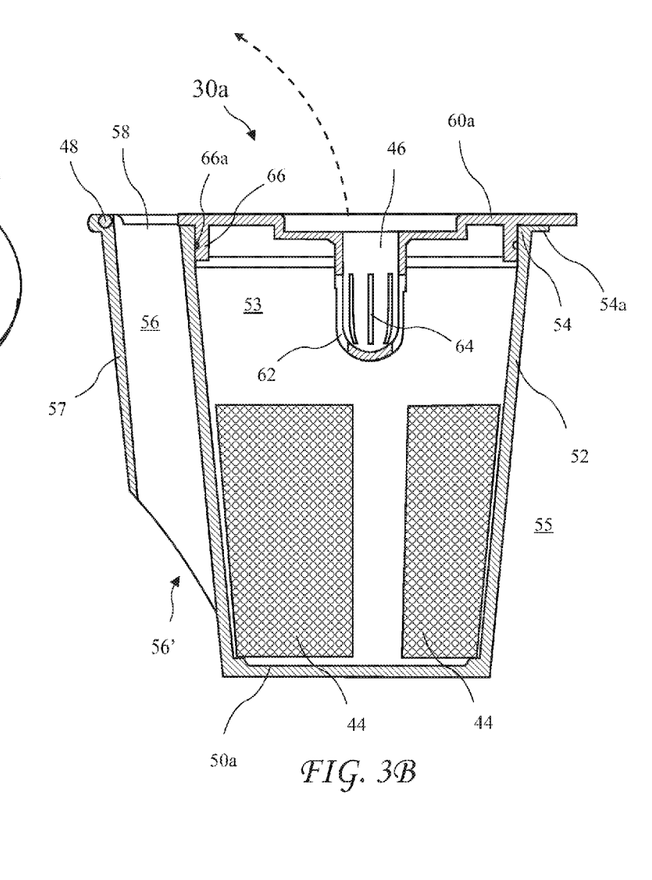
FIG. 3B is a cross-sectional view of the first reusable brewing cartridge according to the present invention taken along line 3B-3B of FIG. 3A.

A perspective view of a first reusable brewing cartridge 30a according to the present invention is shown in FIG. 3A and a cross-sectional view of the first reusable brewing cartridge 30a taken along line 3B-3B of FIG. 3A is shown in FIG. 3B. The reusable brewing cartridge 30a includes a base 40a and a lid 60. The base 40a includes a floor (or bottom) 50a, walls 52 reaching up from the floor 50a, and a wall top 54. An interior 53 is defined inside the base 50 and an exterior 55 outside the base 40a. A pocket interior 56 is formed outside the wall 52 and is preferably separated by a portion of the wall 52 from the interior 53. A rim 54a projecting out from the top 54 rests on the cartridge shelf 11 (see FIG. 2C) when a cartridge resides in the coffee maker 10. A pocket entrance 58 is permanently open proximal to the top 54 of the walls 52. The pocket interior 56 may have an open bottom 56' or a closed bottom 57a (see FIG. 4B), and is shown with an open bottom in FIG. 3B. A pocket wall 57 surrounds the pocket 56 and provides an indexing feature for the reusable brewing cartridge 30a guiding insertion of the reusable brewing cartridge 30a into the brewing chamber to align the extraction needle 19b with the pocket interior 56.

The lid 60a includes a cylindrical ring 66 reaching down into the base 40a and forming an interference fit to seal the lid 60a to the base 40a. An O-ring 66a may further provide the interference fit. The lid 60a further includes a permanent lid passage 46 allowing the injection nozzle 19a to enter the reusable brewing cartridge 30a and a diffuser 62 including vertical slots 64 which distribute fluid into the interior 53. A passageway 45 in the walls 52 provides fluid communication between the interior 53 and exterior 55, and mesh material 44 separates the interior 53 from the exterior 55 retaining brewing material in the reusable brewing cartridge 30a. The reusable brewing cartridge 30a may receive loose brewing material through the open lid 60a. Further, the mesh material 44 may be fixed to the walls 52 or be an exposed portion of a mesh basket insertable and removable from the base 40a. The mesh material 44 may additionally or alternatively be exposed through a passageway through the floor 50a.

Figure 4A:
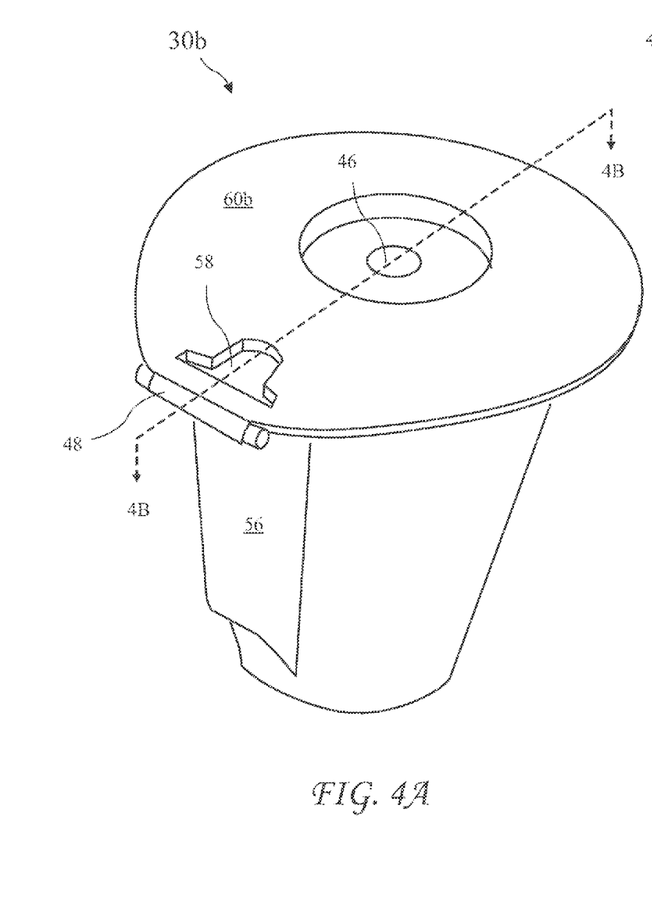
FIG. 4A is a second reusable brewing cartridge according to the present invention.
Figure 4B:
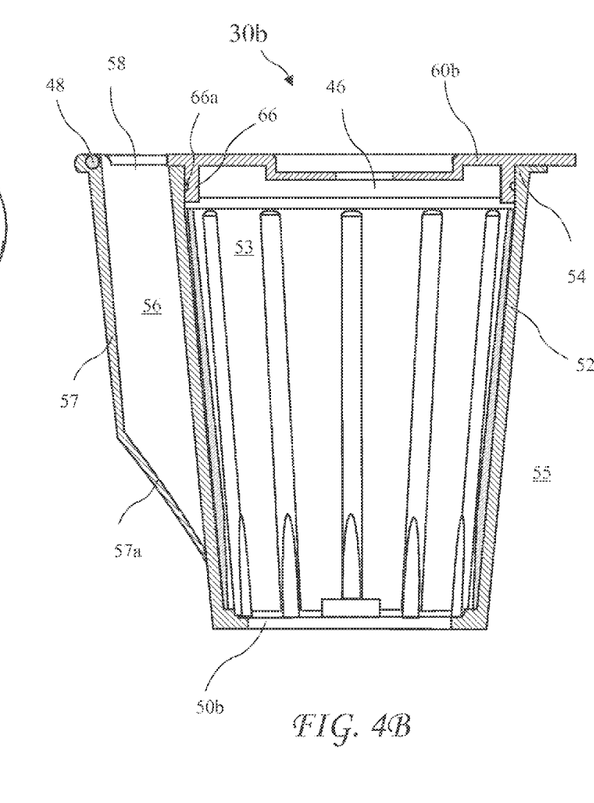
FIG. 4B is a cross-sectional view of the second reusable brewing cartridge according to the present invention taken along line 4B-4B of FIG. 4A.

A perspective view of a second reusable brewing cartridge 30b according to the present invention is shown in FIG. 4A and a cross-sectional view of the second reusable brewing cartridge 30b taken along line 4B-4B of FIG. 4A is shown in FIG. 4B. The reusable brewing cartridge 30b is similar to the reusable brewing cartridge 30a except the reusable brewing cartridge 30b has an open floor 50b and does not include mesh material between the interior 53 and exterior 55. The pocket 56 of either reusable brewing cartridge 30a or 30b may have a floor 57a closing the bottom of the pocket 56.

Figure 5:
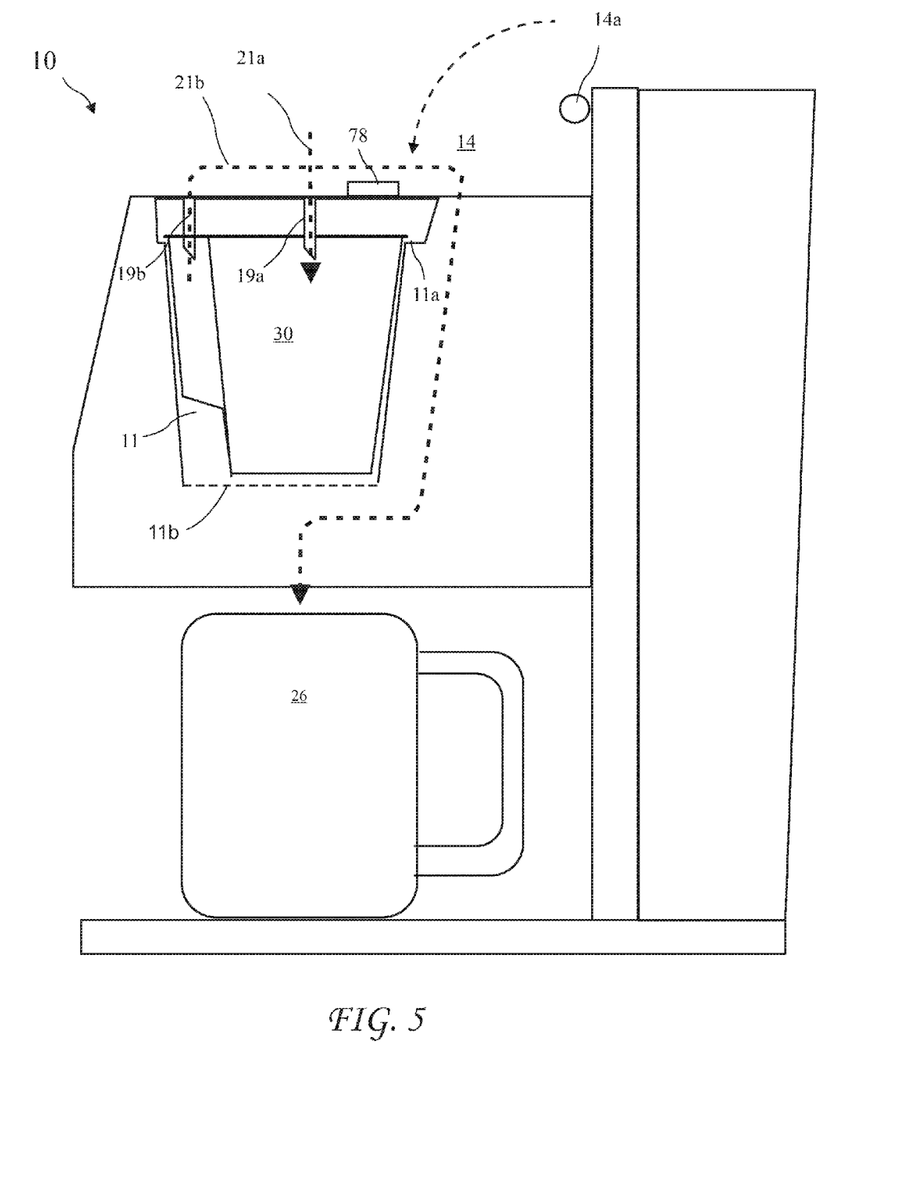
FIG. 5 shows a single use disposable brewing cartridge in a coffee maker.

FIG. 5 shows the single use reusable brewing cartridge 30 in the brewing chamber 11 of the coffee maker 10. Both the injection and extraction nozzles 19a and 19b pierce the cover of the disposable brewing cartridge 30. A flow 21a enters the disposable brewing cartridge 30 through the nozzle 19a and a second flow 21b escapes the disposable brewing cartridge 30 through the nozzle 19b. The brewing chamber 11 has a brewing chamber bottom 11b under the disposable brewing cartridge 30.

Figure 6:
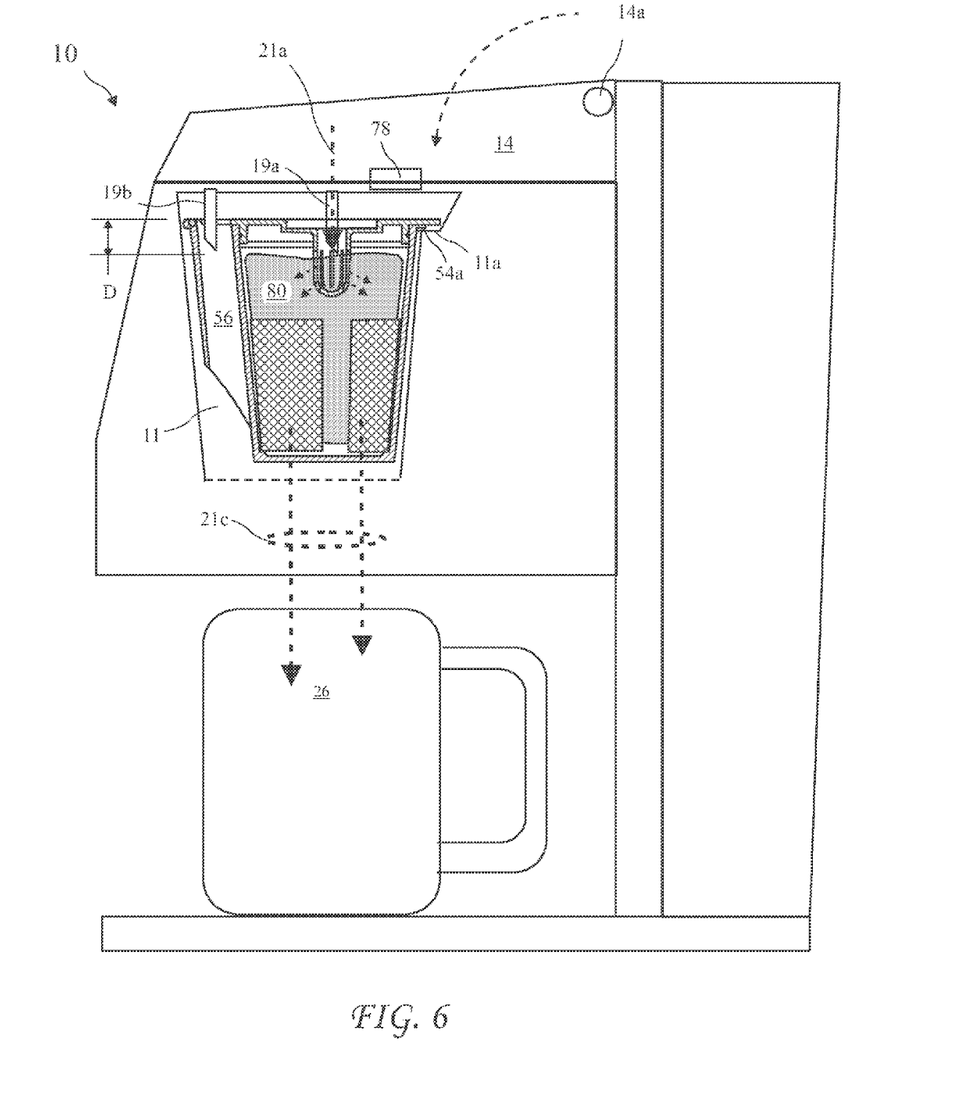
FIG. 6 shows the first reusable brewing cartridge according to the present invention in the coffee maker.

FIG. 6 shows the first reusable brewing cartridge 30a in the brewing chamber 11 of the coffee maker 10. The rim 54a of the reusable brewing cartridge 30a rests on the shelf 11a of the brewing chamber 11, and the pocket 56 resides in the notch 11a', thus aligning the pocket 56 with the extraction needle 19b. Brewing material 80 is held in the reusable brewing cartridge 30a. The injection nozzle 19a enters the reusable brewing cartridge 30a through the lid passage 46 and the diffuser 62 diffuses the flow 21a through the slots 64 to uniformly distribute the flow 21a to the brewing material 80. A flow 21c of brewed beverage escapes from the reusable brewing cartridge 30a through the mesh material 44 and is released into the brewing chamber 11. Advantageously, although the coffee maker is intended to carry the brewed beverage through the extraction nozzle 19b to release the brewed beverage into the coffee container 26, the brewing chamber 11 includes openings which release any brewed drink escaping into the brewing chamber generally downward and into the coffee container 26. The extraction needle 19b enters the pocket 56 a distance D below the top of the reusable brewing cartridge 30a, and the pocket 56 provides clearance to prevent puncturing contact (i.e., the needle 19b may touch the reusable brewing cartridge 30a, but not puncture the reusable brewing cartridge 30a) between the extraction needle 19b and the reusable brewing cartridge 30a. By avoiding use of the extraction needle 19b, issues of sealing between the extraction needle 19b and the reusable brewing cartridge 30a are avoided.

Figure 7:
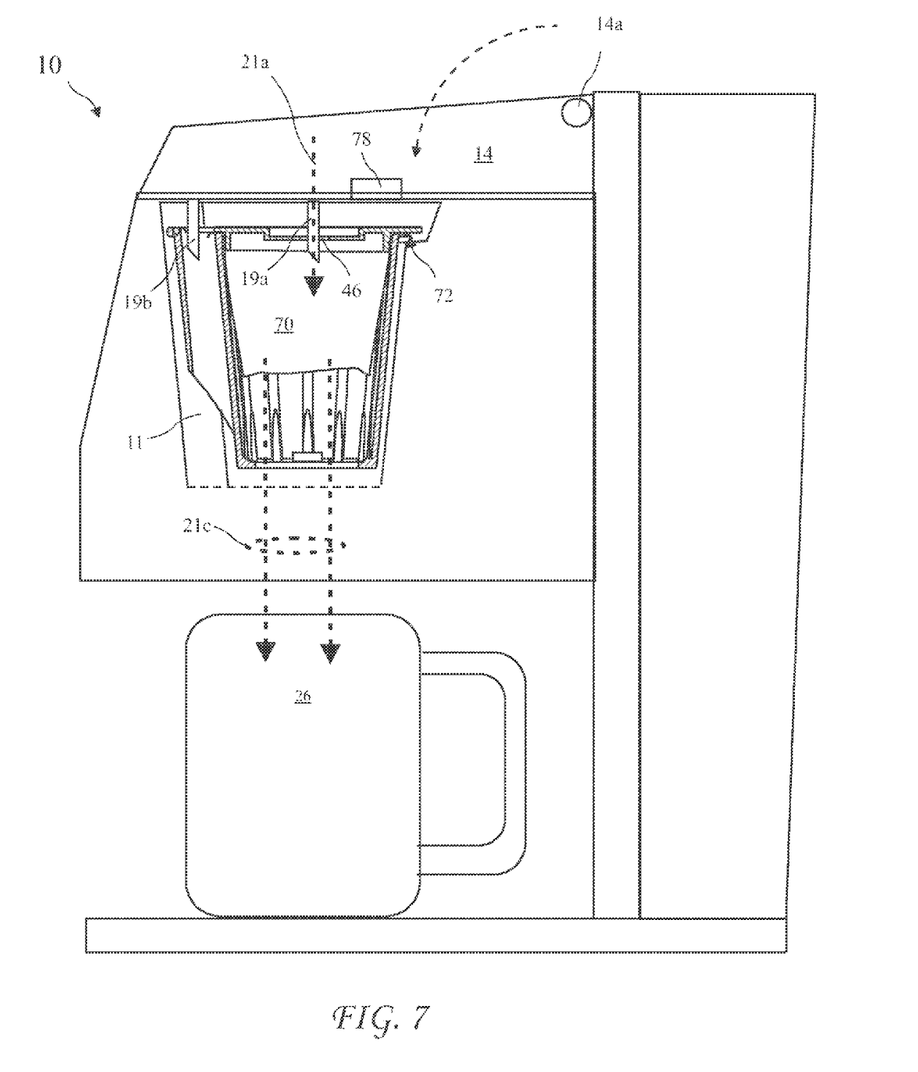
FIG. 7 shows the second reusable brewing cartridge according to the present invention in the coffee maker.

FIG. 7 shows the second reusable brewing cartridge 30b in the brewing chamber 11 of the coffee maker 10. A filter paper cup 70 is held in the reusable brewing cartridge 30a by trapping a rim 72 of the filter paper cup 70 between the lid 60b and body 40b of the reusable brewing cartridge 30b. The injection nozzle 19a enters the reusable brewing cartridge 30b through the lid passage 46 and pierces the filter paper cup 70 injecting the flow 21a into brewing material contained in the filter paper cup 70. A flow 21c of brewed beverage escapes from the reusable brewing cartridge 30b through the open bottom 50b and is released into the brewing chamber 11. Advantageously, although the coffee maker is designed to carry the brewed beverage through the extraction nozzle 19b to release the brewed beverage into the coffee container 26, the brewing chamber 11 is configured to release any brewed drink escaping into the brewing chamber generally downward and into the coffee container 26.

The reusable brewing cartridges 30a and 30b are preferably made from plastic, and more preferably from a plastic material of a color providing the indicia 34. Making the reusable brewing cartridge from such plastic material provides a robust indicia not easily damaged, and allows freedom in design of the coffee maker 10 to place the reader 78 at any location viewing the reusable brewing cartridge. Both the material and color of the plastic may form the desired indicia.

While the invention herein disclosed has been described by means of specific embodiments and applications thereof, numerous modifications and variations could be made thereto by those skilled in the art without departing from the scope of the invention set forth in the claims.

I claim:

1. A beverage brewer, comprising:
a water tank containing liquid;
a brewing chamber having a brewing chamber interior and a brewing chamber bottom under the brewing chamber interior;
a beverage brewer lid above the brewing chamber and openable to expose the brewing chamber interior and closeable over the brewing chamber for brewing beverage;
side by side injection and extraction needles attached to the beverage brewer lid and reaching down into the interior of the brewing chamber when the brewing beverage lid is closed, the water tank in fluid communication with the injection needle;
a beverage brewer platform under the brewing chamber configured to support a brewed beverage container residing under the brewing chamber and in fluid communication with the interior of the brewing chamber;
a reusable brewing cartridge configured to reside in the brewing chamber, the reusable brewing cartridge comprising:
a cartridge base having, a bottom, and walls reaching from the bottom to an open rim at a top of the walls, the brewing cartridge configured to position the bottom of the cartridge base towards the brewing chamber bottom when the brewing cartridge resides in the brewing chamber, the walls and bottom of the cartridge base unobstructably exposed to the brewing chamber interior when the reusable brewing cartridge resides in the brewing chamber for brewing a brewed beverage;
a cartridge base interior defined by the bottom and the walls and an exterior outside the cartridge base, the cartridge base interior configured to contain a serving of brewing material;
a permanently open base passageway between the cartridge base interior and the exterior, the permanently open base passageway configured to allow brewed drink to escape the reusable brewing cartridge into the brewing chamber;
a cartridge lid sealingly engagable onto the open rim at the top of the cartridge base, the cartridge lid including a generally horizontal annular outer portion;
a permanent lid passage generally centered on the cartridge lid configured to receive the injection needle and to receive liquid through the injection needle;
a pocket residing on the cartridge base walls and reaching to at least a depth D below the open rim at the top of the cartridge base; and
a permanently open pocket entrance proximal to an edge of the open rim at the top of the cartridge base,
wherein the permanent lid passage and the pocket are configured to receive the extraction needle and to provide a clearance between the extraction needle and the cartridge lid and the cartridge base such that the extraction needle does not have puncturing contact with the cartridge lid or the cartridge base when the beverage brewer lid is closed to operate the beverage brewer.

2. The beverage brewer of claim 1, wherein the pocket has an open bottom.

3. The beverage brewer of claim 1, wherein the pocket has a closed bottom.

4. The beverage brewer of claim 1, wherein a pocket interior of the pocket is separated from the cartridge base interior by the base walls.

5. The beverage brewer of claim 1, wherein the cartridge lid includes the permanently open pocket entrance above the pocket.

6. The beverage brewer of claim 1, wherein a mesh filter resides between the interior and the exterior.

7. The beverage brewer of claim 6, wherein the mesh filter is fixedly attached to the base and covers the base passageway.

8. The beverage brewer of claim 7, wherein the base passageway is an opening in the base walls.

9. The beverage brewer of claim 7, wherein the base passageway is an opening in the base bottom.

10. The beverage brewer of claim 6, wherein the mesh filter is a removable basket residing in the interior.

11. The beverage brewer of claim 6, wherein the mesh filter is in the walls of the base or in the bottom of the base provides an unobstructed vertically downward path for brewed beverage to flow into the brewed beverage container.

12. The beverage brewer of claim 1, wherein brewing material is contained in a filter paper cup residing in the reusable brewing cartridge and the base bottom is open.

13. The beverage brewer of claim 12, wherein:
the cartridge lid includes a cylindrical portion configured to slide down into the interior of the cartridge base providing an interference fit due to friction between parallel surfaces of the cylindrical portion of the lid and the interior of the cartridge base; and
the filter paper cup includes a rim captured between the parallel surfaces of the cylindrical portion of the lid and the interior of the cartridge base to hold the filter paper.

14. The beverage brewer of claim 1, wherein a pocket interior of the pocket is isolated from cartridge base interior during all use of the beverage brewer.

15. The beverage brewer of claim 1, wherein a pocket interior of the pocket has closed walls.

16. The beverage brewer of claim 1, wherein there is no fluid communication between a pocket interior of the pocket and the cartridge base interior during all use of the beverage brewer.

17. A reusable brewing cartridge, comprising:
the reusable brewing cartridge configured to reside in a brewing chamber interior of a brewing chamber of a beverage brewer, the beverage brewer having side by side injection and extraction needles reaching down from a beverage brewer lid of the beverage brewer, the beverage brewer lid openable to place the reusable brewing cartridge into the brewing chamber interior and closeable over the reusable brewing cartridge in the brewing chamber interior, a brewing chamber bottom opposite to the beverage brewer lid and at a bottom of the brewing chamber;
a cartridge base having a bottom, and walls reaching from the bottom to an open rim at a top of the walls, the open rim at the top of the walls and the bottom residing in generally parallel, vertically spaced apart planes and the reusable brewing cartridge configured to position the bottom of the cartridge base towards the brewing chamber bottom when the reusable brewing cartridge resides in the brewing chamber, the walls and bottom of the cartridge base in unobstructed fluid communication with the brewing chamber interior when the reusable brewing cartridge resides in the brewing chamber for brewing a brewed beverage;
a cartridge base interior defined by the bottom and the walls and an exterior outside the cartridge base, the cartridge base interior configured to contain a serving of brewing material;
a passageway between the cartridge base interior and exterior, the passageway configured to allow brewed drink to escape the reusable brewing cartridge into the brewing chamber;
a cartridge lid sealingly engagable onto the open rim at the top of the walls,
a permanent passage generally centered on the cartridge lid configured to receive the injection needle and to receive liquid through the injection needle;
a pocket residing outside the cartridge base walls and reaching to at least a depth D below the open rim at the top of the walls, the pocket separated from the cartridge base interior by the cartridge base walls; and
a permanently open pocket entrance proximal to the open rim at the top of the walls and aligned with the pocket, the permanently open pocket entrance providing entry of the extraction needle into the pocket,
wherein the pocket is disposed to receive the extraction needle and to provide lateral clearance between the extraction needle and the pocket, and the depth D is selected to exceed the incursion of the extraction needle into the reusable brewing cartridge when the reusable brewing cartridge resides in the brewing chamber of the beverage brewer.

18. A reusable brewing cartridge, comprising:
the reusable brewing cartridge configured to reside in a brewing chamber interior of a brewing chamber of a beverage brewer, the beverage brewer having side by side injection and extraction needles reaching down from a beverage brewer lid of the beverage brewer, the beverage brewer lid openable to place the reusable brewing cartridge into the brewing chamber interior and closeable over the reusable brewing cartridge in the brewing chamber interior, a brewing chamber bottom opposite to the beverage brewer lid and at a bottom of the brewing chamber;
a cartridge base having a bottom, and walls reaching from the bottom to an open rim at a top of the walls, the open rim at the top of the walls and bottom residing in generally parallel, vertically spaced apart planes and the configured to position the bottom of the cartridge base towards the brewing chamber bottom when the resides in the brewing chamber, the walls and bottom of the cartridge base are in unobstructed fluid communication with the brewing chamber interior when the reusable brewing cartridge resides in the brewing chamber for brewing a brewed beverage;
a cartridge base interior defined by the bottom and the walls and an exterior outside the cartridge base, the cartridge base interior configured to contain a serving of brewing material;
a passageway between the cartridge base interior and exterior, the passageway configured to allow brewed drink to escape the reusable brewing cartridge into the brewing chamber;
a cartridge lid sealingly engagable onto the open rim at the top of the walls,
a permanent passage generally centered on the cartridge lid configured to receive the injection needle and to receive liquid through the injection needle;

a pocket residing outside the cartridge base walls and reaching to at least a depth D below the open rim at the top of the walls, the pocket separated from the cartridge base interior by the cartridge base walls; and a permanently open pocket entrance proximal to the open rim at the top of the walls and aligned with the pocket, the permanently open pocket entrance providing entry of the extraction needle into the pocket, wherein:

the pocket is disposed to receive the extraction needle and to provide lateral clearance between the extraction needle and the pocket, and the depth D is selected to exceed the incursion of the extraction needle into the reusable brewing cartridge when the reusable brewing cartridge resides in the brewing chamber of the beverage brewer; and the cartridge base and the cartridge lid are made of a colored plastic material selected to provide a color indicia to a reader in visual contact with the reusable brewing cartridge when the reusable brewing cartridge resides in the brewing chamber, the indicia controlling operation of the beverage brewer.

\* \* \* \* \*